United States Patent
Das et al.

(10) Patent No.: US 10,534,645 B2
(45) Date of Patent: Jan. 14, 2020

(54) METHOD AND SYSTEM FOR EXECUTING PROCESSES IN A VIRTUAL STORAGE AREA NETWORK

(71) Applicant: Wipro Limited, Bangalore (IN)

(72) Inventors: Rishav Das, Howrah (IN); Karanjit Singh, Tarn Taran (IN)

(73) Assignee: Wipro Limited, Bangalore (IN)

( * ) Notice: Subject to any disclaimer, the term of this patent is extended or adjusted under 35 U.S.C. 154(b) by 170 days.

(21) Appl. No.: 15/408,816

(22) Filed: Jan. 18, 2017

(65) Prior Publication Data

US 2018/0143859 A1    May 24, 2018

(30) Foreign Application Priority Data

Nov. 23, 2016   (IN) .............................. 201641040000

(51) Int. Cl.
  *G06F 9/46*   (2006.01)
  *G06F 9/50*   (2006.01)
  *H04L 29/08*  (2006.01)

(52) U.S. Cl.
  CPC ........ *G06F 9/5016* (2013.01); *H04L 67/1097* (2013.01)

(58) Field of Classification Search
  CPC ...................................................... G06F 9/52
  USPC ........................................................ 718/104
  See application file for complete search history.

(56) References Cited

U.S. PATENT DOCUMENTS

| | | | | |
|---|---|---|---|---|
| 7,093,147 B2 * | 8/2006 | Farkas | ................. | G06F 1/3203 713/320 |
| 8,996,461 B1 * | 3/2015 | Natanzon | ................ | G06F 21/60 707/634 |
| 9,128,855 B1 * | 9/2015 | Natanzon | ............ | G06F 12/0866 |
| 9,158,579 B1 * | 10/2015 | Robles | .................. | G06F 9/4881 |
| 2010/0153960 A1 * | 6/2010 | Youn | ..................... | G06F 9/5061 718/104 |
| 2011/0047149 A1 * | 2/2011 | Vaananen | ......... | G06F 17/30672 707/723 |
| 2012/0054769 A1 * | 3/2012 | Jensen | .................. | G06F 9/4881 718/104 |

(Continued)

OTHER PUBLICATIONS

Rasley, J., et al., "Efficient Queue Management for Cluster Scheduling", *Proceedings of the Eleventh European Conference on Computer Systems*, Jan. 1, 2016, pp. 1-15.

(Continued)

*Primary Examiner* — Mehran Kamran
(74) *Attorney, Agent, or Firm* — Finnegan, Henderson, Farabow, Garrett & Dunner, LLP (57) ABSTRACT

The present disclosure relates to a method and system for executing processes in Virtual Storage Area Network by an array controller. The array controller receives a request for executing a process in VSAN, calculates a time duration for execution of the received process, compares calculated time duration with a predefined time duration, where the received process is divided into a first part and a second part if the calculated time duration exceeds the pre-defined time duration, executes the first part of the received process and assigns the second part of received process to a management server for execution, where the management server comprises a plurality of processing units dedicated for executing the second part of the received process.

6 Claims, 6 Drawing Sheets

(56) References Cited

U.S. PATENT DOCUMENTS

| | | | |
|---|---|---|---|
| 2012/0191641 A1* | 7/2012 | Crupi | G06F 17/30289 707/602 |
| 2013/0031124 A1* | 1/2013 | Santosuosso | H04L 67/1097 707/769 |
| 2013/0238599 A1* | 9/2013 | Burris | G06F 17/3087 707/722 |
| 2013/0297592 A1* | 11/2013 | Dean | G06F 17/30194 707/722 |
| 2014/0215313 A1* | 7/2014 | Daly | G06F 17/2264 715/235 |
| 2014/0237477 A1* | 8/2014 | Cadambi | G06F 9/4881 718/103 |
| 2014/0279922 A1* | 9/2014 | Kottomtharayil | G06F 9/505 707/654 |
| 2014/0310258 A1* | 10/2014 | Tian | G06F 17/30445 707/718 |
| 2014/0310259 A1* | 10/2014 | Tian | G06F 17/30545 707/718 |
| 2015/0254105 A1* | 9/2015 | Nishimura | G06F 9/4881 718/103 |
| 2015/0379083 A1* | 12/2015 | Lang | G06F 17/30436 707/722 |
| 2016/0140177 A1* | 5/2016 | Chamberlin | G06F 17/30463 707/717 |
| 2016/0203183 A1* | 7/2016 | Katakawa | G06F 17/30451 707/718 |
| 2016/0292226 A1* | 10/2016 | Konik | G06F 17/30463 |
| 2017/0116289 A1* | 4/2017 | Deshmukh | G06F 17/30545 |
| 2017/0195365 A1* | 7/2017 | Basson | H04L 63/20 |

OTHER PUBLICATIONS

Extended European Search Report issued in the European Patent Office in counterpart European Application No. 17159810.5, dated Aug. 11, 2017, 10 pages.

https://www.emc.com/collateral/white-papers/h11752-intro-to-XtremIO-array-wp.pdf, "Introduction to the EMC XtremIO Storage Array (Ver.4.0) A detailed Review", $EMC^2$ Apr. 2015, 1-65.

John Nicholson, "VMware VIRTUAL SAN™ 6.2 Design end Sizing Guide", *VMware Storage and Availability Documentation*, Mar. 2016, pp. 1-108.

\* cited by examiner

Fig.5

METHOD AND SYSTEM FOR EXECUTING PROCESSES IN A VIRTUAL STORAGE AREA NETWORK

TECHNICAL FIELD

The present subject matter is related in general to the field of virtual storage area network, more particularly, but not exclusively to a method and system for executing processes in a Virtual Storage Area Network.

BACKGROUND

In recent years, there has been a great expansion of computers and storage subsystems. With ever increasing computing technologies, a demand for storage capacity has grown by several folds. These storage demands are fulfilled to a greater extent with the development of Storage Area Network (SAN) technology. A Storage Area Network (SAN) is a dedicated high-speed network which interconnects and presents shared pool of storage devices to multiple servers. The SAN technology is primarily used to enhance the performance of the storage devices, as they appear as a single, locally attached device to the servers. Virtual Storage Area Network (VSAN) is a logical partition in the Storage Area Network (SAN). Virtual Storage Area Network allows data traffic to be isolated within specific portions of SAN so that the system is scaled out and easy to configure. The main objective of Virtual Storage Area Network is easy management of users subscribed to the VSAN, who can be added or relocated without the need for changing the physical layout of the storage. One of the main objective of VSAN is to provide data redundancy which minimizes the risk of data loss.

In the existing technology, SAN consists of two storage controllers which receive requests from the users, one Disk Array Enclosure (DAB) which holds multiple Solid State Drives (SSD) for storing the data and few backup units. Each of the storage controllers has multi-core Control Processing Units (CPUs) for processing requests. These requests in the existing technology are not executed immediately, but queued in one of the multi-core processors for execution, if other pending processes are under execution by that multi-core CPU. This causes delay in executing the process, which leads to increase in latency for executing the process and overall performance of the SAN gets affected. For example, a user who wishes to store data in SAN may experience latency in the process as the request made may be held up in the queue.

Additionally, in case the CPU cores in the existing technique reaches complete utilization, a failure to proceed with the execution cycle occurs and all the processes go into queue. Also, in case if both the storage controllers in the existing SAN technology are completely utilized, then it may lead to data unavailability and the user fails to access the application.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for executing processes in Virtual Storage Area Network (VSAN). The method comprises receiving request for executing a process in a Virtual Storage Area Network (VSAN), calculating a time duration for the execution of the received process, comparing the calculated time duration with a predefined time duration. The received process is divided into a first part and a second part upon determining the calculated time duration to be greater than the predefined time duration. The method comprises assigning the second part of the received process to a management server for execution. The management server comprises a plurality of processing units dedicated for executing the second part of the received process.

In an embodiment, the present disclosure relates to an array controller for executing processes in VSAN. The array controller comprises a processor and a memory communicatively coupled to the processor, wherein the memory stores processor executable instructions, which, on execution, may cause the array controller to receive request for executing a process in a Virtual Storage Area Network (VSAN), calculate a time duration for the execution of the received process, compare the calculated time duration with a predefined time duration. The received process is divided into a first part and a second part upon determining the calculated time duration to be greater than the pre-defined time duration. The array controller executes the first part of the received process and assigns the second part of the received process to a management server for execution. The management server comprises a plurality of processing units dedicated for executing the second part of the received process.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for execution of processes in a Virtual Storage Area Network (VSAN). The present disclosure provides a plurality of array controllers for executing processes in the Virtual Storage Area Network (VSAN). In some embodiments, the process execution may be carried out by utilizing additional plurality of processing units in the VSAN. The additional plurality of the processing units may be associated with a management server in the VSAN. In an embodiment, the plurality of processing units associated with the management server may be dedicated to execute divided parts of a process. Whenever, a time duration calculated for executing the process by an array controller of the plurality of array controllers present in the VSAN exceeds a pre-defined time duration, the process may be divided into two parts. The divided two parts of the process are shared for execution between the additional plurality of processing units associated with the management server and the array controller. The division of process into the two parts and execution by additional processing units may help in reducing latency in executing the process and hence improves the overall efficiency of the VSAN.

Figure 1A:
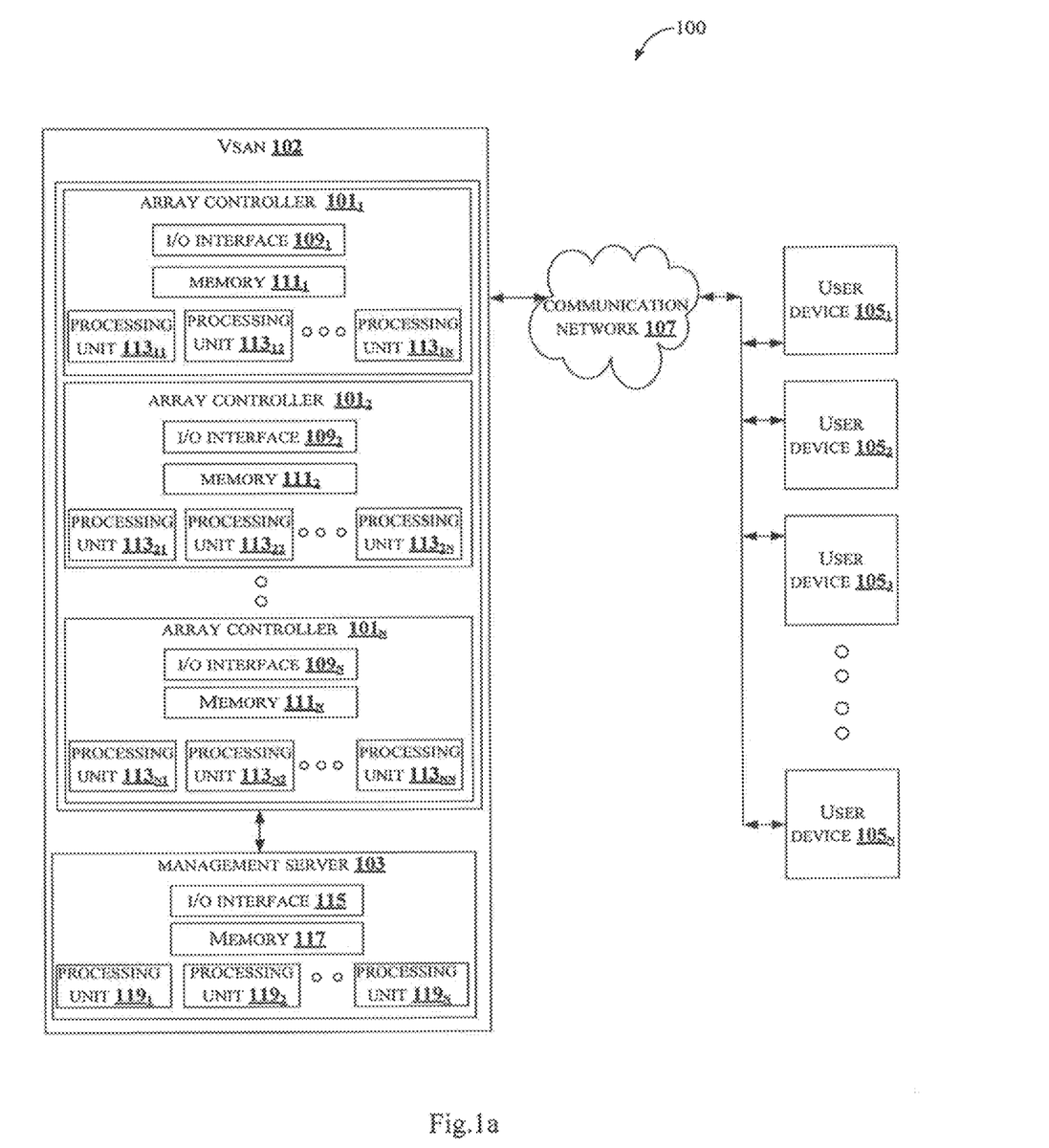
FIG. 1a illustrates an exemplary environment for executing processes in VSAN in accordance with some embodiments of the present disclosure.

FIG. 1a illustrates an exemplary environment for executing processes in a VSAN in accordance with some embodiments of the present disclosure.

Figure 1B:
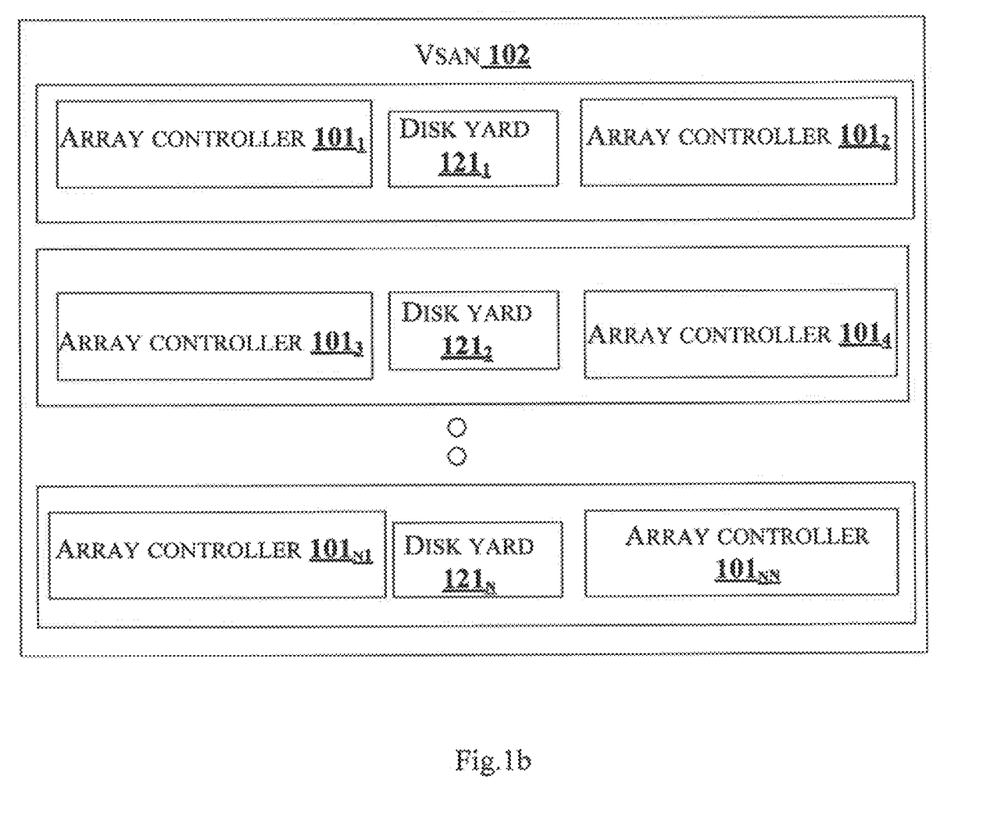
FIG. 1b illustrates an exemplary block diagram of plurality of array controllers in VSAN in accordance with some embodiments of the present disclosure.

As shown in FIG. 1a, the environment 100 comprises an array controller $101_1$, an array controller $101_2$ . . . and array controller $101_N$ (collectively referred as plurality of array controllers 101) connected through a communication network 107 to a user device $105_1$, a user device $105_2$, . . . and a user device 105 (collectively referred as plurality of user devices 105). The plurality of array controllers 101 may be present in the VSAN 102. In some embodiment, the plurality of user devices 105 may be devices present with users for requesting operations in the VSAN 102. The plurality of array controllers 101 executes processes in the VSAN 102. The VSAN 102 may comprise the plurality of array controllers 101 and a management server 103. A person skilled in the art would understand that the VSAN 102 may also comprise other devices or units for performing functions of VSAN. In some embodiments, the plurality of array controllers 101 may be utilized for managing disk drives and presenting them as logical units. The plurality of array controllers 101 may process and execute requests made by the users. In some embodiment, the plurality of array controllers 101 in the VSAN 102 may be present in pairs along as shown in FIG. 1b. FIG. 1b comprises the array controller $101_1$ and the array controller $101_2$ as a pair along with a disk yard $121_1$. Similarly, other pairs of array controllers and corresponding disk yards may be present in the VSAN 102. The disk yard may consist of actual disk drives of the array controllers in pair which may store data. The processes received for execution in the VSAN 102 may be randomly assigned to the pairs of the array controller. Further, the array controllers $101_1$ may comprise an I/O interface $109_1$, a memory $111_1$, and a processing unit $113_{11}$, a processing unit $113_{12}$ . . . and a processing unit $113_{1N}$ as shown in FIG. 1. Similarly, the array controller $101_2$, . . . , array controller $101_N$ comprises respective I/O interface, memory and processing units. The processing units of the plurality of array controllers 101 are collectively referred as plurality of processing units 113 of the array controllers 101. In some embodiment, the plurality of processing units 113 may perform operations associated with the requests made by the users. In some embodiment, the management server 103 may be core of the VSAN 102 which may manage the plurality of array controllers 101 and overall functioning of data storage and retrieval in the VSAN 102. In some embodiment, the management server 103 may be used for processing storage system management tasks. A person skilled in the art would understand that any other tasks may also be performed by the management server of the present disclosure. The management server 103 may comprise an I/O interface 115, a memory 117 and a processing unit $119_1$, a processing unit $119_2$ . . . and a processing unit $119_N$ (collectively referred to as plurality of processing units 119 of the management server). The plurality of processing units 119 of the management server 103 may be used for executing processes assigned by an array controller of the plurality of array controllers 101. Further, for the execution of processes in the VSAN 102, the array controller may initially receive the requests from the users through the plurality of user devices 105. In some embodiment, the plurality of user devices 105 may include, but are not limited to, a laptop, a desktop computer, a Personal Digital Assistant (PDA), a notebook, a smartphone, a tablet and any other computing devices. In some embodiment, the request for executing the process may comprise a request for storing data in the VSAN 102 and a request for retrieving stored data from the VSAN 102. On receiving the request from the user, the process associated with the request may be randomly allocated to one array controller of the plurality of array controllers 101. In some embodiments, the process may be allocated to the array controller based on at least load and/or processing capacity on each of the processing unit of the plurality of processing units 113 of the plurality of array controllers 101. A person skilled in the art would understand that any other criterion may also be used to allocate the process in the present disclosure. Further, on receiving the process, the array controller of the plurality of array controllers 101 may calculate a time duration for the execution on the received process. In some embodiments, the array controller to which the process is allocated may comprise pending processes for execution. In some embodiment, the time duration calculated for the received process may correspond to the time duration calculated for the execution of the received process and a time duration required for executing the pending processes, if any, by the array controller to which the process may be allocated. The array controller may further compare the calculated time duration with a pre-defined time duration. In case, the calculated time duration exceeds the pre-defined time duration, the array controller of the plurality of array controllers 101 may divide the received process into a first part and a second part. The array controller of the plurality of array controllers 101 may execute the first part of the received process and may assign the second part of the received process to the management server 103 for execution. Otherwise, if the calculated time duration does not exceed the pre-defined time duration, the process may be executed by the array controller completely. In some embodiments, the plurality of processing units 119 associated with the management server 103 may be dedicated to execute second part of the received process. On execution of the first part and second part of the received process, the array controller may combine a result of the execution for providing to the user.

The plurality of array controllers 101 comprises respective I/O Interface, memory and processing units. Each of the I/O interface may be configured to receive the request from the plurality of user devices 105 for executing the process in the VSAN 102. Each of the t I/O interface may also receive result of the second part of the received process from the management server 103.

The received information from each of the I/O interface is stored in the memory. The memory is communicatively coupled to each of the processing units of the plurality of array controllers 101. The memory also stores processor instructions which cause the processing units to execute the instructions for the execution of processes in the VSAN 102.

Figure 2:
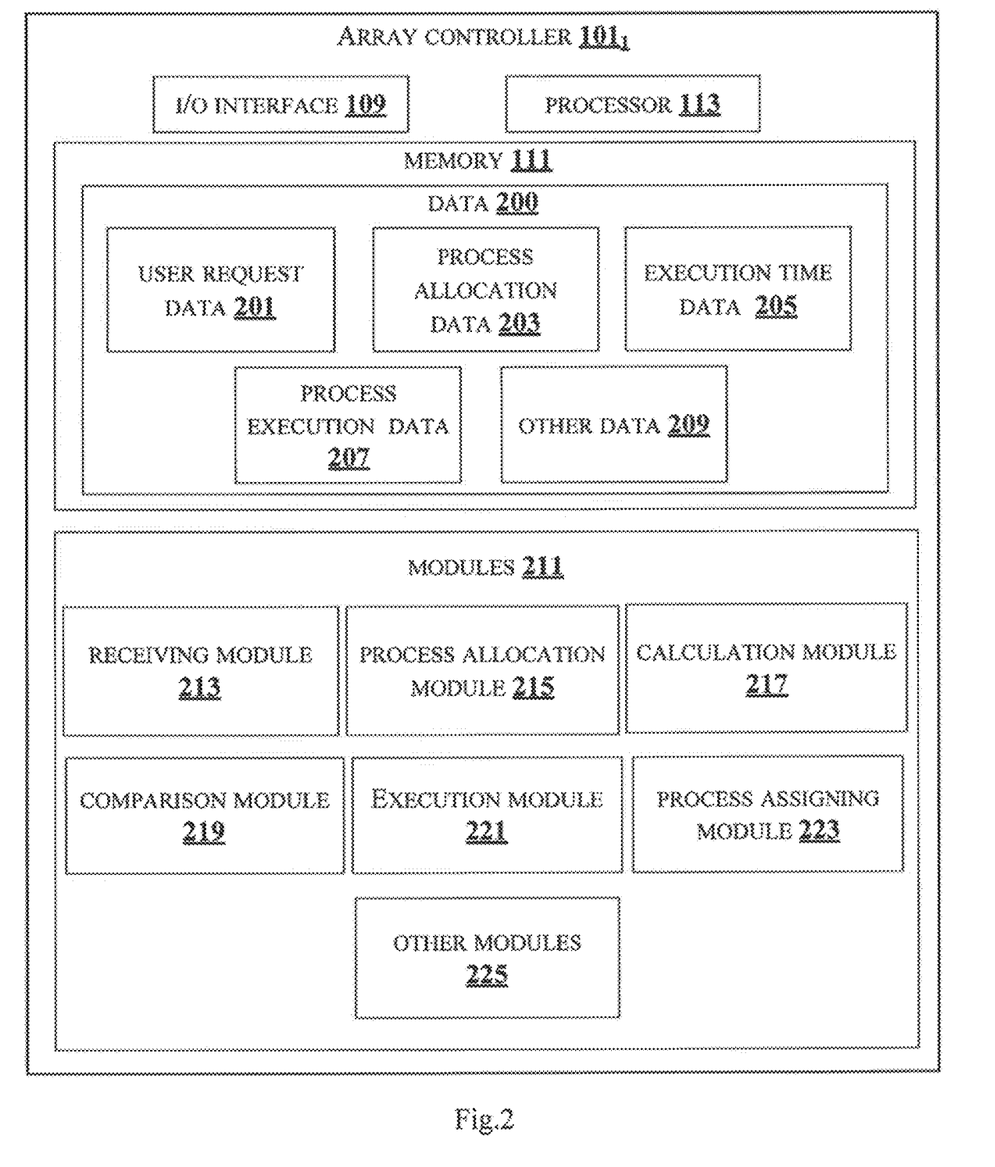
FIG. 2 shows a detailed block diagram of an array controller in accordance with some embodiments of the present disclosure.

FIG. 2 shows a detailed block diagram of an array controller in accordance with some embodiments of the present disclosure.

Data 200 and one or more modules 211 of the array controller 101 are described herein in detail. In an embodiment, the data 200 comprises user request data 201, process allocation data 203, execution time data 205, process execution data 207 and other data 209.

The user request data 201 may comprise details about the request made by the users to retrieve data from the VSAN 102 and store data in the VSAN 102. The request may be for executing the process which may be the request for storing the data in the VSAN 102 and the request for retrieving stored data from the VSAN 102. In some embodiment, the request may be made by the users to the VSAN 102 through the communication network 107.

The execution time data 205 may comprise the time duration calculated for the execution of the received process. In some embodiment, the time duration may be calculated in real-time based on the pending processes with the array controller $101_1$. The execution time data 205 may also comprise the pre-defined time duration which may be the time duration within which execution of any requested process may be required to be completed by the array controller $101_1$.

The process execution data 207 may comprise details about the execution of the received process. In case, the received process is divided into the first part and the second part, the process execution data 207 may comprise details about first part which may be executed by the processing unit associated with the array controller $101_1$ and second part which may be assigned to the management server 103 for execution.

The other data 209 may store data, including temporary data and temporary files, generated by modules for performing the various functions of the array controller $101_1$.

In an embodiment, the data 200 in the memory 111 are processed by the one or more modules 211 of the array controller $101_1$. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 211 may include, but are not limited to, a receiving module 213, a process allocation module 215, a calculation module 217, an actual time determination module 219, a comparison module 221 and a process assigning module 223. The one or more modules 211 may also comprise other modules 225 to perform various miscellaneous functionalities of the array controller $101_1$. It will be appreciated that such modules may be represented as a single module or a combination of different modules.

The receiving module 213 may receive the request from the users through the plurality of user devices 105 for executing the process in the VSAN 102. The request for executing the process may include, but is not limited to, the request for storing data in the VSAN 102 and the request for retrieving the stored data from the VSAN 102. The receiving module 213 may also receive execution result from the management server 103 for the second part of the received process. In some embodiments, the result of the execution of the received process may either be from the processing units of the array controller alone or a combined result from the processing unit of the array controller and the processing units of the management server 103.

The process allocation module 215 may allocate the received process associated with the request made by the users to an array controller of the plurality of array controllers 101. The allocation of the received process associated with the request may be performed randomly. In some embodiments, the received process may be allocated based on at least one of the load and the processing capacity on each of the processing unit of the plurality of processing units 113 associated with the plurality of array controllers 101. In some embodiments, the received process may be allocated to the array controller $101_1$ of the plurality of array controllers 101 which may have either a less load or which comprises higher processing capacity.

Upon allocating the received process to the array controller $101_1$ of the plurality of array controllers 101, the calculation module 217 may calculate the time duration required for executing the received process. In some embodiments, the time duration may vary for each individual process based on nature of the process. In some embodiments, the calculation module 217 may calculate the time duration required for the execution by identifying if any processes are pending for execution in the array controller $101_1$. In case, the array controller $101_1$ does not have any pending processes, the execution time duration corresponds to the time duration required for executing the received process. In another case, if the calculation module 217 determines presence of pending processes for execution with the array controller $101_1$, the time duration may correspond to the time duration required for the execution of the received process and a time duration required for execution of the pending processes on the array controller $101_1$.

The comparison module 219 may compare the calculated time duration for completing the execution of the received process with the pre-defined time duration. In case, the calculated time duration exceeds the pre-defined time duration, the received process may be divided into the first part and the second part. In some embodiments, the pro-defined time duration for execution of the process by the plurality of array controllers 101 may be provided by the users.

The execution module 221 may execute the first part of the received process in case the calculated execution time duration of the received process exceeds the pro-defined time duration. In another case, if the calculated time duration does not exceed the pre-defined time duration, the execution module 221 may execute the entire received process.

The process assigning module 223 may assign the second part of the received process to the management server 103. The second part may be assigned when the calculated time duration exceeds the pre-defined time duration. The second part of the received process may be assigned for execution by the management server 103. In some embodiments, the management server 103 may determine the processing unit from the plurality of processing units 119 for executing the second part of the received process based on load and processing capacity of the plurality of processing units 119. In some embodiments, the plurality of processing units 119 associated with the management server 103 may be dedicated for executing the second part of the received process. In some embodiments, the result of the execution from the array controller $101_1$ and the result of the execution from the management server 103 may be combined to provide to the users.

Figure 3:
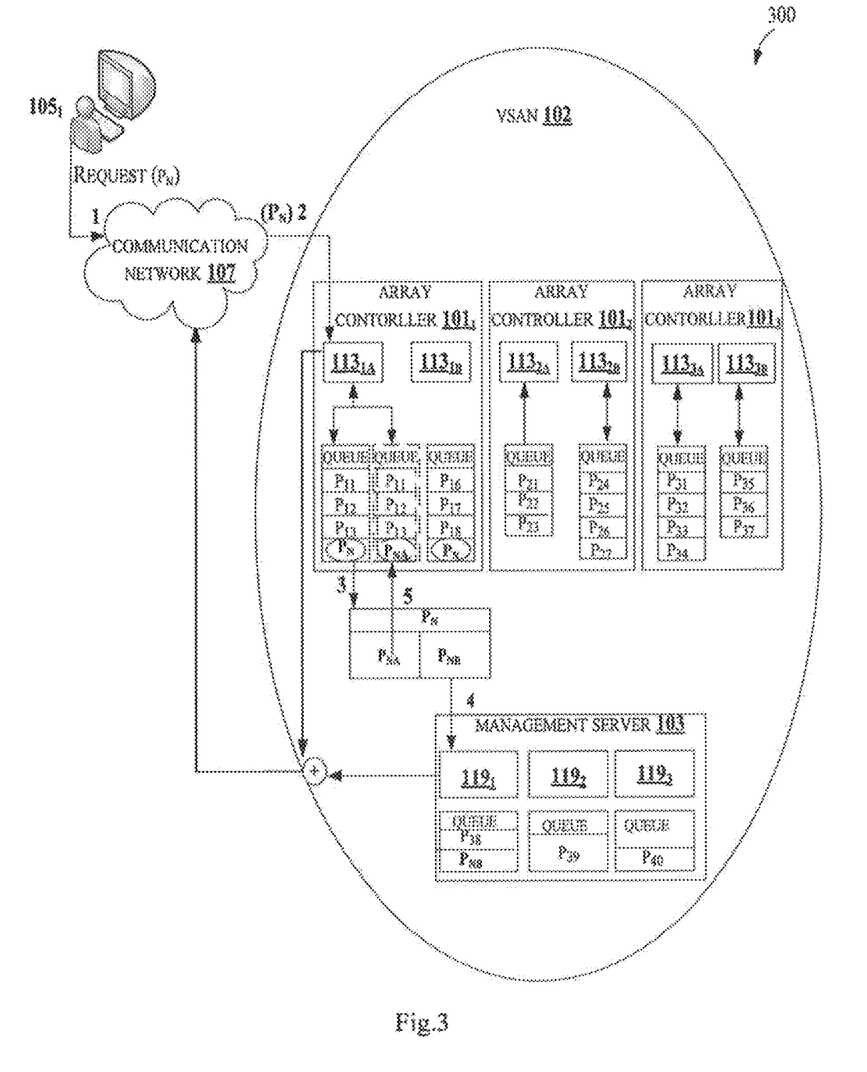
FIG. 3 shows an exemplary representation of execution of a process in a VSAN in accordance with some embodiments of the present disclosure.

FIG. 3 shows an exemplary representation of execution of a process in VSAN in accordance with some embodiment of the present disclosure.

As shown in FIG. 3, the environment 300 illustrates a scenario of execution of a process in a VSAN in an exemplary embodiment of the present disclosure. The environment 300 illustrates a VSAN 102 connected through the communication network 107 to a user device $105_1$ associated with a user as shown in the FIG. 3. The VSAN 102 may comprise an array controller $101_1$, an array controller $101_2$, an array controller $101_3$ and a management server 103. A person skilled in the art would understand that FIG. 3 is an exemplary embodiment and the present disclosure may also include plurality of array controllers. The array controller $101_1$ may comprise a processing unit $113_{1A}$ and a processing unit $113_{1B}$. Likewise, each of the array controllers comprises two processing units as shown in the FIG. 3. A person skilled in the art would understand that the array controllers may also comprise plurality of processing units. Further, in a non-limiting embodiment, the management server 103 may comprise a processing unit $119_1$, a processing unit $119_2$ and a processing unit $119_3$. Initially, at step (1), the user associated with the user device $105_1$ makes a request for executing a process $P_N$ in the VSAN 102. A person skilled in the art would understand that there may be a plurality of user devices requesting processes in the VSAN 102 simultaneously. As shown in FIG. 3, each of the processing units associated with the array controllers and the management server 103 may comprise a process queue. The process queue may comprise all the processes assigned to the respective processing units. Let's assume that process queues of both the processing units associated with the array controller $101_2$ and the array controller $101_3$ are occupied by pending processes and may not be able to take any other processes. In some embodiment, the processing unit $113_{1A}$ of the array controller $101_1$ may be determined to have lesser load than the processing units associated with the array controller $101_2$ and the array controller $101_3$ (not shown explicitly in the FIG. 3). At step (2), the process $P_N$ may be assigned to the processing unit $113_{1A}$ of the array controller $101_1$. The process $P_N$ may be then added to the process queue of the processing unit $113_{1A}$. Further, on receiving the process $P_N$, the array controller $101_1$ calculates the time duration required for executing the process $P_N$ associated with the request. As shown in FIG. 3, the process queue of the processing unit $113_{1A}$ may comprise pending processes $P_{11}$, $P_{12}$ and $P_{13}$ for execution. In such case, the execution time duration may be a combination of the time duration calculated for the process $P_N$ and a time duration required for all the pending processes $P_{11}$, $P_{12}$ and $P_{13}$. Further, a comparison between the calculated time duration and the pre-defined time duration is performed. The pre-defined time duration is the time duration within which the received process may be required to be executed. At step (3), on determining the calculated time duration for executing the process P to be greater than the pre-defined time duration, the process $P_N$ is divided into two parts $P_NA$ and $P_{NB}$. At step (4), the array controller $101_1$ may execute the divided process $P_{NA}$ and may assign the divided process $P_{NB}$ to the processing unit $119_1$ of the management server 103. FIG. 3 shows an updated process queue of the processing unit $113_{1A}$ adjacent to the original process queue with the divided process $P_{NA}$. In some embodiments, the load and the processing capacity of each of the processing units of the management server 103 may be determined by the management server 103. Based on the determined load and the processing capacity, the processing unit of the management server 103 may be selected for executing divided processes. The process $P_{NA}$ may be executed by the processing unit $113_{1A}$ of the array controller $101_1$ and the process $P_{NB}$ may be executed by the processing unit $119_1$ of the management server 103. The result of the execution of the divided process $P_{NA}$ and the process $P_{NB}$ are collated and provided to the user as a single executed process.

Figure 4:
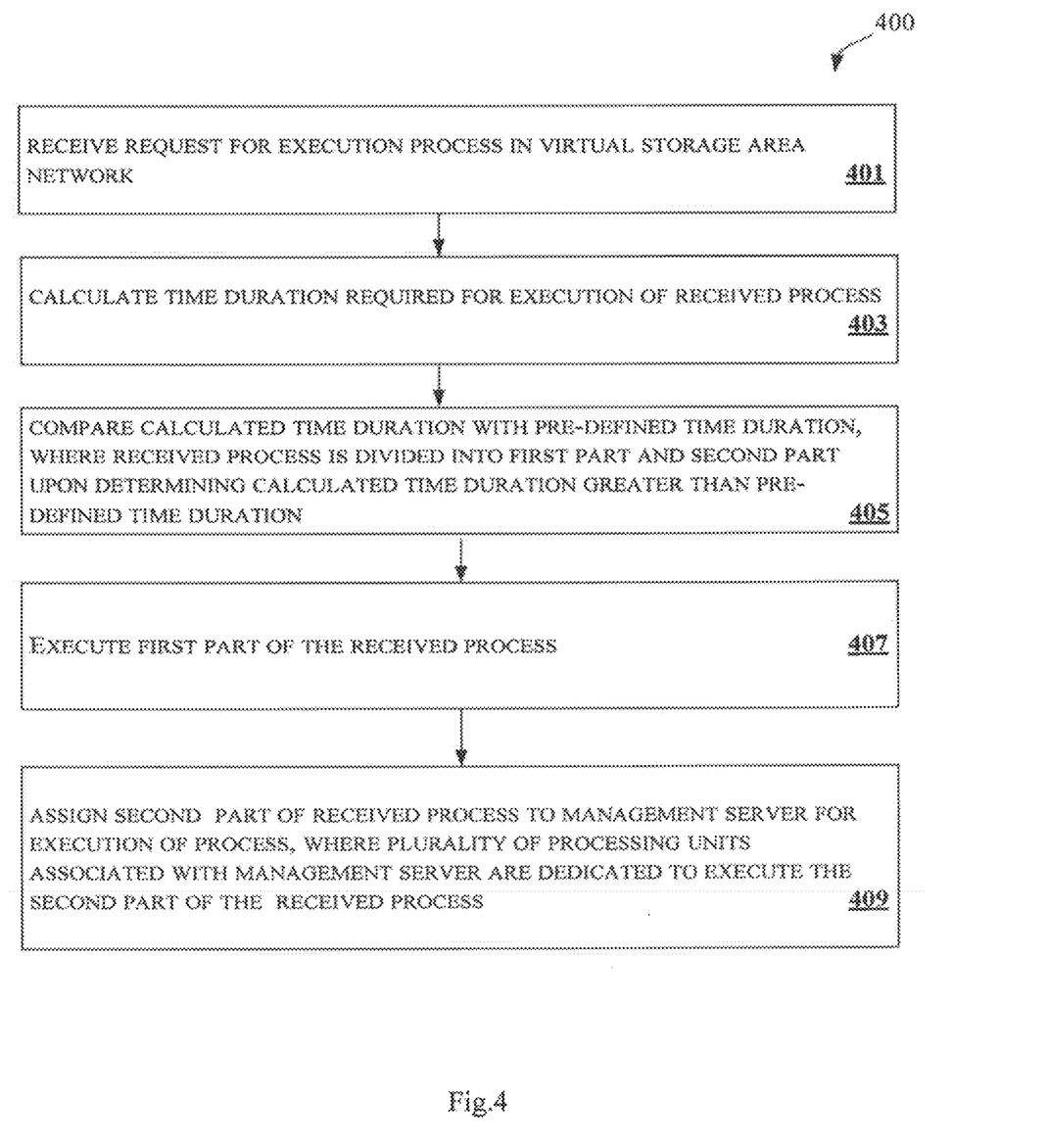
FIG. 4 illustrates a flowchart showing a method for executing processes in Virtual Storage Area Network in accordance with some embodiments of present disclosure.

FIG. 4 illustrates a flowchart showing a method for executing processes in Virtual Storage Area Network in accordance with some embodiments of present disclosure.

As illustrated in FIG. 4, the method 400 comprises one or more blocks for executing processes in a Virtual Storage Area Network. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the array controller of the plurality of array controllers 101 may receive the request for executing the process in the Virtual Storage Area Network.

At block 403, the array controller may calculate the time duration for the execution of the received process.

At block 405, the array controller may compare the calculated time duration with the predefined time duration. In case, the calculated time duration exceeds the pre-defined time duration, the received process may be divided into the first part and the second part.

At block 407, the array controller may execute the first part of the received process.

At block 409, the array controller may assign the second part of the received process to the management server 103 for execution of the process. The plurality of processing units 119 associated with the management server 103 are dedicated to execute the second part of the received process.

Computing System

Figure 5:
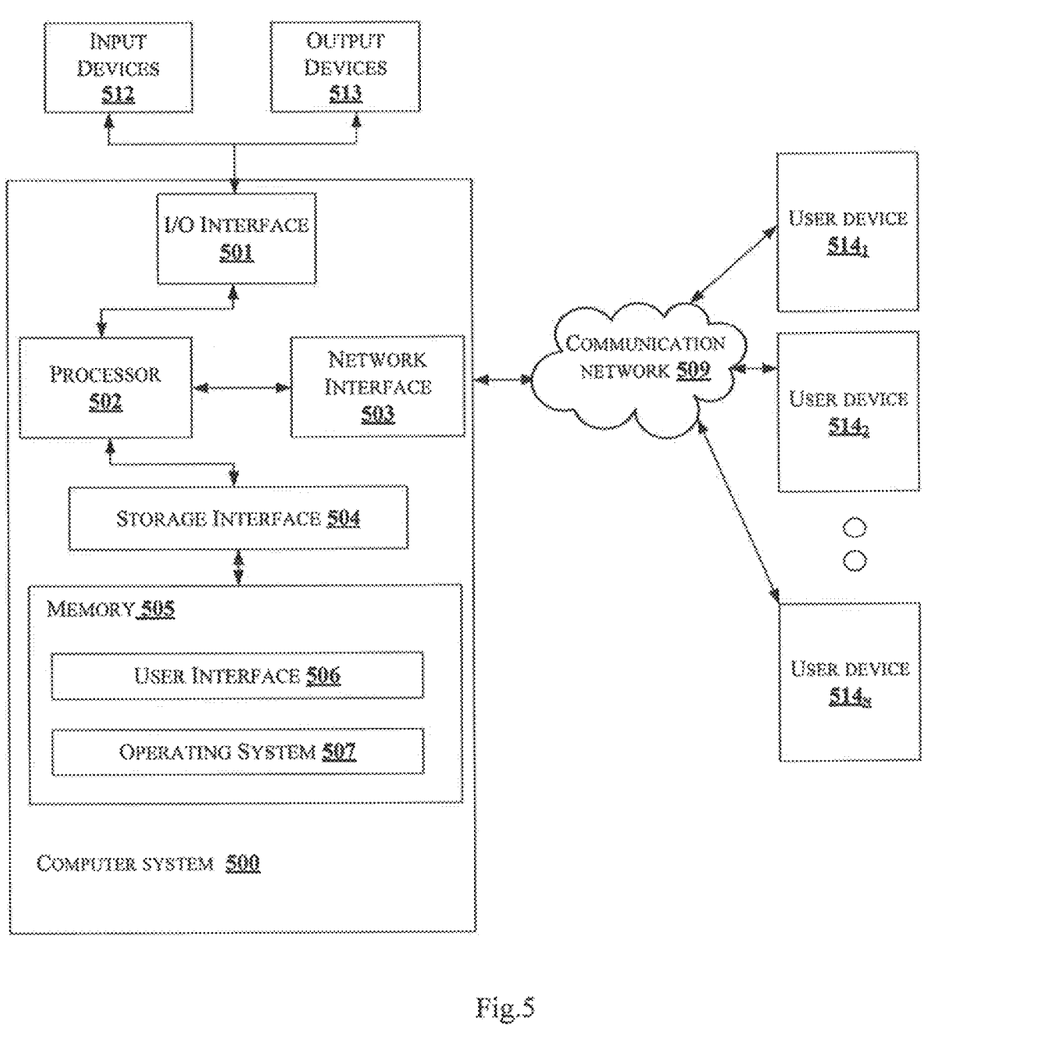
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the Virtual Storage Area Network 102. The computer system 500 may comprise a central processing unit ("CPU" or "processor") 502. The processor 502 may comprise at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a process execution server 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a user devices $514_1$, a user device $514_2$ . . . and a user device $514_N$ (collectively referred as plurality of user devices 514). The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

In an embodiment of the present disclosure, the load on the processing units in the VSAN is shared by utilizing additional processing units for execution and thereby enhancing the processing of the VSAN.

An embodiment of the present disclosure reduces latency in execution of processes in the VSAN.

An embodiment of the present disclosure provides dedicated processing units of management server for executing divided parts of processes.

An embodiment of the present disclosure may facilitate execution of the processes in VSAN quickly and efficiently.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Process execution server |
| 103 | Plurality of storage servers |
| 105 | Management server |
| 107 | Plurality of user devices |
| 108 | Communication network |
| 109 | Communication network |
| 111 | I/O interface |
| 113 | Memory |
| 115 | Processor |
| 117 | Plurality of processing units |
| 119 | Plurality of processing units of management server |
| 200 | Data |
| 201 | User request data |
| 203 | Process allocation data |
| 205 | Execution time data |
| 207 | Process execution data |
| 209 | Other data |
| 211 | Modules |
| 213 | Receiving module |
| 215 | Process allocation module |
| 217 | Calculation module |
| 219 | Actual time determination module |
| 221 | Comparison module |
| 223 | Process assigning module |
| 225 | Other modules |

What is claimed is:

1. A method for executing processes in a Virtual Storage Area Network (VSAN), the method comprising:
   receiving, by an array controller, a request for executing a process in a Virtual Storage Area Network (VSAN);
   calculating, by the array controller, a first time duration for the execution of the received process;
   identifying, by the array controller, one or more pending processes which are pending for execution with the array controller;
   calculating, by the array controller, a second time duration for execution of the one or more pending processes;
   comparing, by the array controller, calculated time duration with a predefined time duration, wherein the calculated time duration is a combination of the calculated first time duration and the second time duration;
   dividing, by the array controller, the received process into a first part and a second part upon determining the calculated time duration to be greater than the pre-defined time duration;
   executing, by the array controller, the first part of the received process; and
   assigning, by the array controller, the second part of the received process to a management server for execution, wherein the management server comprises a plurality of processing units dedicated for executing the second part of the received process.

2. The method as claimed in claim 1, wherein the request for executing the process comprises at least one of a request for storing data in the Virtual Storage Area Network (VSAN) and a request for retrieving data from the VSAN.

3. The method as claimed in claim 1, further comprising combining result of the execution of the first part and the second part of the received process.

4. An array controller for executing processes in a Virtual Storage Area Network (VSAN), comprising:
   a processor, and
   a memory communicatively coupled to the processor, wherein the memory stores processor instructions, which, on execution, causes the processor to:
      receive a request for executing a process in a Virtual Storage Area Network (VSAN);
      calculate a first time duration for the execution of the received process;
      identify one or more pending processes which are pending for execution with the array controller;
      calculate a second time duration for execution of the one or more pending processes;
      compare calculated time duration with a predefined time duration, wherein the calculated time duration is a combination of the calculated first time duration and the second time duration;
      divide the received process into a first part and a second part upon determining the calculated time duration to be greater than the pre-defined time duration;
      execute the first part of the received process; and
      assign the second part of the received process to a management server for execution, wherein the management server comprises a plurality of processing units dedicated for executing the second part of the received process.

5. The array controller as claimed in claim 4, wherein the request for executing the process comprises at least one of a request for storing data in the Virtual Storage Area Network (VSAN) and a request for retrieving data from the VSAN.

6. The array controller as claimed in claim 4, wherein the processor combines result of the execution of the first part and the second part of the received process.

* * * * *